United States Patent Office 3,535,521
Patented Oct. 20, 1970

3,535,521
SATELLITE ATTITUDE CONTROL UTILIZING A PLURALITY OF INFRARED SENSORS
Arnold M. Levine, Chatsworth, Calif., assignor to International Telephone and Telegraph Corporation, Nutley, N.J., a corporation of Delaware
Filed Feb. 28, 1966, Ser. No. 530,590
Int. Cl. G01j 1/20
U.S. Cl. 250—83.3                                                   7 Claims

ABSTRACT OF THE DISCLOSURE

An electronic attitude sensor for a satellite comprising a number of infrared sensitive elements disposed in ports in a satellite. As the satellite scans the earth the output from the cells are added to form a pulse providing information pertaining to the beginning and end of the scan. The pulse is phased compared with a reference waveform to provide orientation information.

---

This invention relates to an attitude sensor system and more particularly to a device for detecting deviations of a satellite from a predetermined reference attitude relative to, for example, the earth.

In certain satellite applications it is a requisite that the satellite's attitude with respect to another body, for example the earth, be precisely stabilized. This can be accomplished by sensing a deviation of the satellite from its predetermined attitude relationship and causing orientation jets or other mechanisms to respond accordingly to the sensed deviation to reorient the satellite.

Since in an exemplary embodiment the satellite is fixed with respect to the earth which is a warm body emitting a substantial amount of infrared radiation infrared radiation sensitive elements are employed as a means for monitoring the position of the satellite with respect to the warm body, the earth. Prior attitude sensors often utilize moving parts, such as optical scanners, to a large extent in the sensing mechanism.

Accordingly, it is an object of this invention to provide an electronic attitude sensor having no moving parts.

The above-mentioned and other features and objects of this invention will become more apparent by reference to the following description taken in conjunction with the accompanying drawings, in which.

Briefly, the hereindescribed embodiment of my invention provides an all electronic attitude sensor having no moving parts which comprises a plurality of infrared sensitive elements disposed in one end of a plurality of ports in the satellite. The output of the cells as the satellite scans the earth is added to form a continuous pulse which upon differentiation provides information pertaining to the beginning and end of the scanning of the earth. This differentiated signal is applied to a phase detector and compared with a reference waveform representing the scanning of the earth plus a portion before and beyond, such that if the differentiated waveform is centered in the sawtooth the output of the phase detector will be zero; any departure from a zero output indicates misorientation in the form of a plus or minus error signal.

Figure 1:
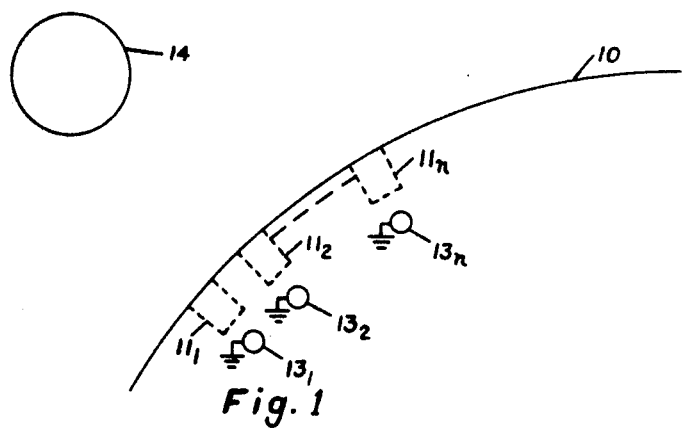
FIG. 1 is a pictorial representation of a satellite showing its attitude with respect to the earth.

FIG. 1 illustrates a satellite 10 having a plurality of ports $11_1$–$11_n$ with a plurality of respective infrared sensitive elements $13_1$–$13_n$ disposed therein. The ports are directed towards a reference body 14 which in this illustrative embodiment would be the earth. This invention is not intended to be limited to a satellite having infrared sensitive elements disposed in ports. It is obvious that alternatively the infrared elements could be arranged about the periphery of the satellite and also that other radiation type sensors might be employed.

Figure 2:
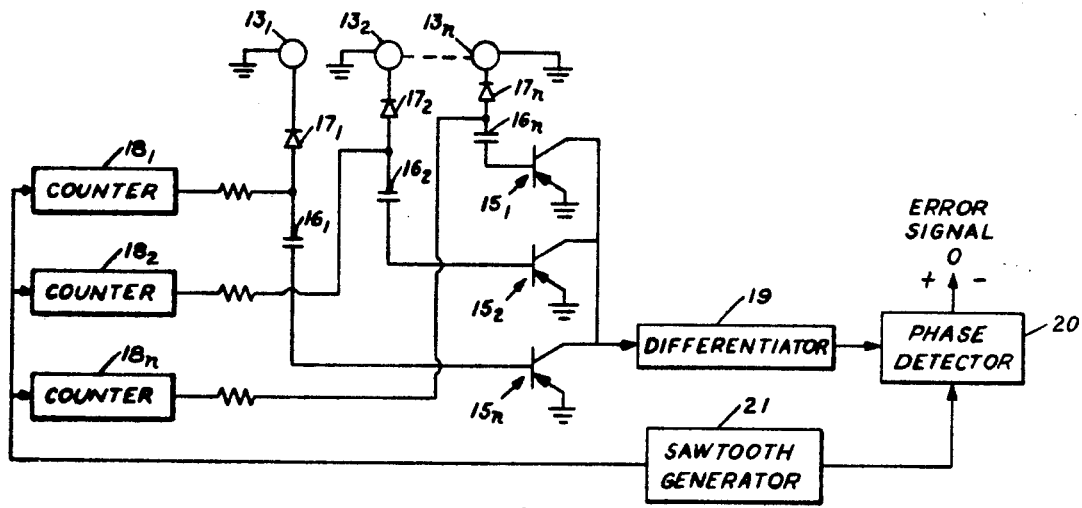
FIG. 2 is a schematic and block diagram of an attitude sensor employed in the satellite of FIG. 1.

FIG. 2 illustrating the electronic attitude sensor shows a plurality of infrared sensitive cells $13_1$–$13_n$ coupled to a plurality of respective amplifiers $15_1$–$15_n$ via corresponding capacitors $16_1$–$16_n$ and diodes $17_1$–$17_n$. The coupling from cells 13 to amplifiers 15 occurs through the high resistance direction of diodes 17 such that no signals are obtained at the outputs of amplifiers 15 until diodes 17 are properly biased. The outputs from a plurality of counters 18 are coupled to respective diodes 17 in a manner to permit current flow from infrared sensitive elements 13 to amplifiers 15 when there is an output from counters 18 and a corresponding output from elements 13.

The outputs from amplifier 15 are combined and coupled to a differentiator 19 with the output therefrom being fed as one input to a phase detector 20. A second input for phase detector 20 is derived from a sawtooth generator 21 which is synchronized to the counters 18. The use of a plurality of counters 18 is to be taken as an example only it being obvious that only one counter could be employed with a plurality of outputs taken at significant bits thereof.

Figure 3:
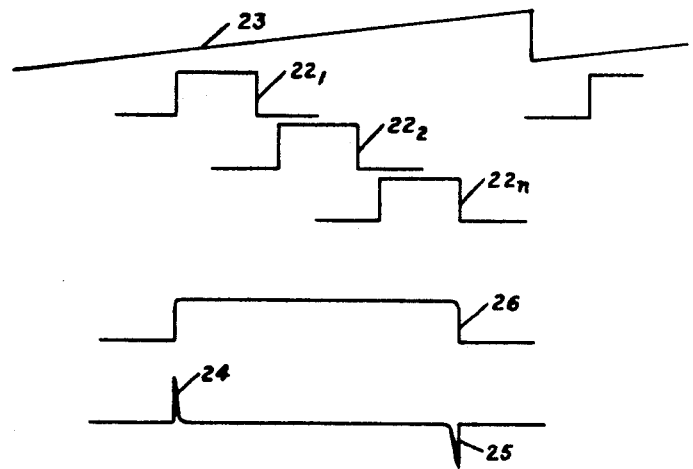
FIG. 3 is a series of waveforms illustrating in a general way what is obtained from the arrangement of FIG. 2.

The operation of the embodiment of FIG. 2 is described with reference to the waveforms of FIG. 3. The initiation of a sawtooth waveform 23 from generator 21 causes one of counters 18 to begin to count, and after a predetermined counting period a signal is derived at the output of counter 18 which causes amplifier 15 to conduct provided that its corresponding infrared cell 13 is orientated with respect to the earth 14 such that infrared radiation is incident thereon. If the infrared cell is receiving infrared radiation, then a pulse $22_1$ will be derived at the output of its respective amplifier 15. Likewise a second counter 18 is coupled such that a second cell $13_2$ will deliver a second pulse $22_2$ if it is receiving radiation. These pulses 22 are added at the outputs of amplifiers 15 to form a continuous pulse 26 which pulse is differentiated at 19 to form a positive spike 24 and a negative spike 25 which define the limits of the scanning process. These spikes along with the sawtooth waveform from generator 21 are applied to phase detector 20 with an output therefrom occurring only if the spikes 24 and 25 are not accurately centered in the sawtooth. This scanning process is repeated over and over and the error signals from phase detector 20 are employed to reorientate the satellite with respect to the earth. The means for providing reorientation are not a part of this invention.

It is not necessary that the satellite be stationary with respect to the earth as is the case of the preferred embodiment described above. If a rotating satellite is employed a second set of scanners could be used to sense the spin and electronically control the attitude of the first set to face the earth.

If the attitude sensor is used to stabilize an antenna array then the sensitive elements could bt mounted thereon. Thus, it is to be understood that the embodiment shown is to be regarded as illustrative only, and that many variations and modifications may be made without departing from the principles of the invention herein disclosed and defined by the appended claims.

I claim:
1. An electronic attitude sensor for providing orien- tation information with respect to a reference body, comprising:
- a plurality of radiation sensitive elements for scanning said reference body;
- means for generating a reference waveform;
- means for scanning said elements in timed relation to said reference waveform;
- means coupled to the output of said elements for comparing the output of said elements with said reference waveform; and
- means couped to said comparing means for providing an error signal when the output of said elements are not accuratey centered with respect to said waveform.

2. An electronic attitude sensor as in claim 1 wherein said means for scanning said elements includes a counter with significant bits thereof being coupled to each of said radiation sensitive elements.

3. An electronic attitude sensor as in claim 1 wherein said means for scanning said elements includes a plurality of counters, one counter coupled to each of said sensitive elements.

4. An electronic attitude sensor as in claim 1 wherein said means for scanning said elements includes means for combining the outputs of said radiation sensitive elements to form a continuous pulse.

5. An electronic attitude sensor as in claim 4, further including a differentiator coupled to said means for combining the outputs of said radiation sensitive elements to form a single pulse, such that the waveform of the scanning process is transformed into a positive and negative pulse denoting the beginning and end of the scanning.

6. An electronic attitude sensor as in claim 1 wherein said means for generating a reference waveform includes a sawtooth generator.

7. An electronic attitude sensor as in claim 6 wherein said comparing means includes a phase detector having first and second inputs and an output, said first input being coupled to said sawtooth generator, said second input being coupled to said differentiator with said output providing an error signal indicating a misorientation.

References Cited
UNITED STATES PATENTS

| | | |
|---|---|---|
| 3,084,253 | 4/1963 | McHenry et al. |
| 3,107,300 | 10/1963 | Stanley et al. |
| 3,348,048 | 10/1967 | McLauchlan et al. |

ARCHIE R. BORCHELT, Primary Examiner

U.S. Cl. X.R.

250—203